June 12, 1928.  1,673,068
S. I. FEKETE
INTAKE HEATER FOR INTERNAL COMBUSTION ENGINES
Filed Jan. 17, 1923
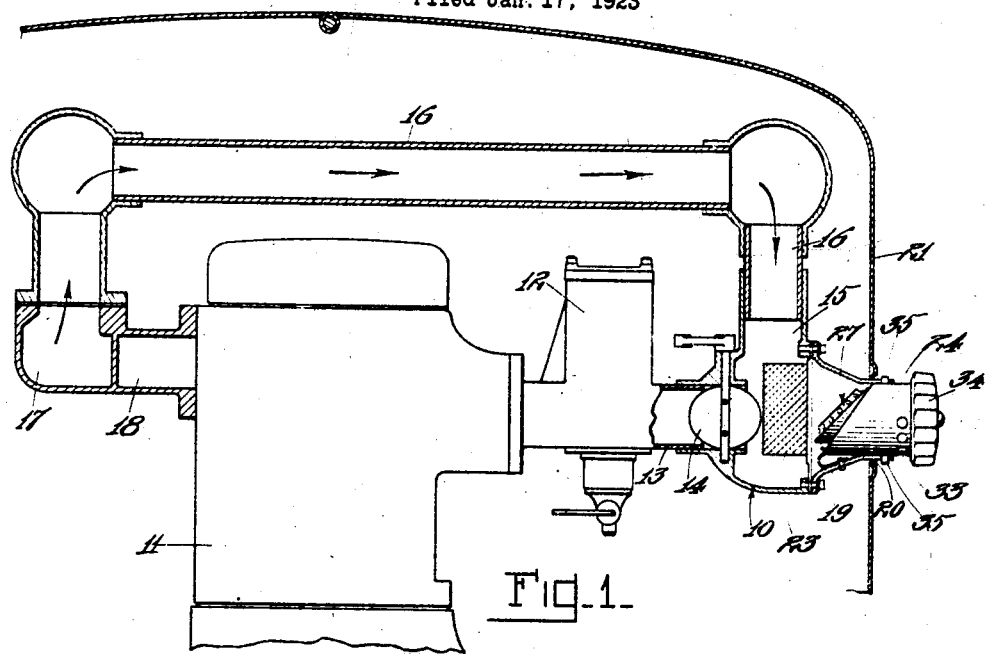
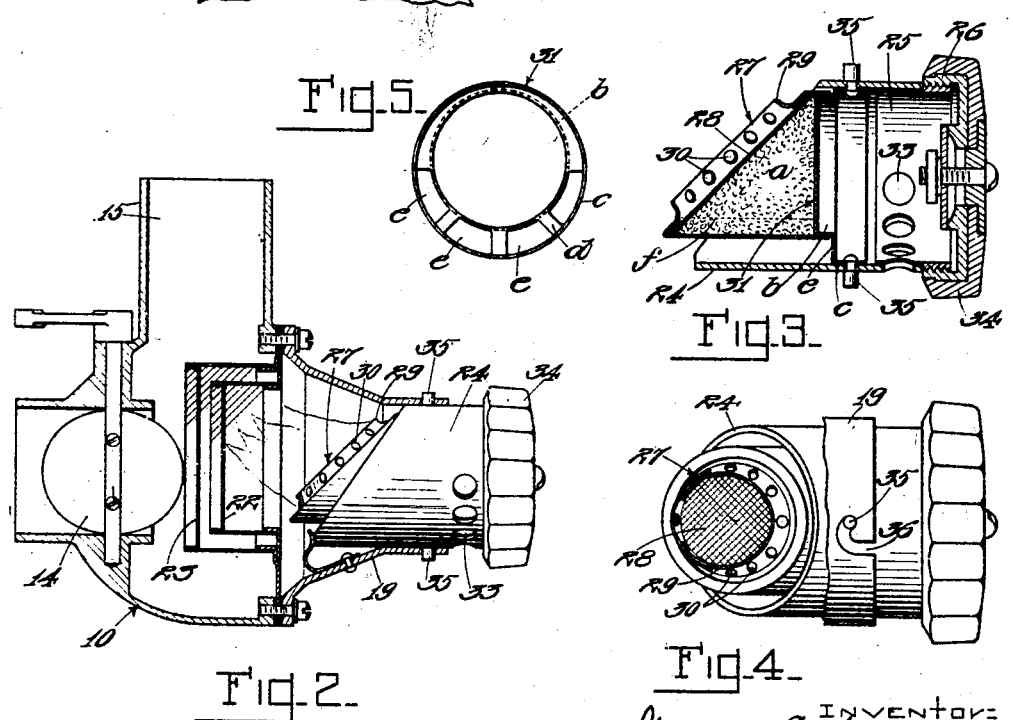
INVENTOR:
Stephen I. Fekete
by Macleod, Calver, Copeland & Dike
Attys Patented June 12, 1928.

1,673,068

UNITED STATES PATENT OFFICE.

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

INTAKE HEATER FOR INTERNAL-COMBUSTION ENGINES.

Application filed January 17, 1923. Serial No. 613,311.

My invention relates to internal combustion engines and particularly to devices for supplying heat to the mixture to cause the engine to start easily in cold weather. The particular object of the invention is to provide a device which by the combustion of the minimum amount of fuel will supply heat directly to the air entering the air intake and cause vaporization of the fuel even under the most unfavorable conditions.

Practically all the heat produced by the device embodying my invention is supplied directly to the stream in the intake pipe leading to the carbureter and, therefore, a relatively small amount of alcohol or the like burned in the heater vaporizes the fuel in the carbureter and starts the engine.

The device embodying my invention consists essentially of a liquid fuel burning lamp insertable in a branch of the intake pipe leading to the carbureter of the engine, which branch has an open end protruding through a hole in the bonnet. To use the device, the lamp is taken out of the intake pipe, this being accomplished without opening the bonnet, the burner is filled with a small amount of liquid fuel, preferably alcohol, and is lighted with a match. The flaming lamp is then inserted in the branch of the intake manifold and the heat therefrom heats the metal parts of the manifold. The engine is then cranked and air drawn through the lamp, thereby improving the combustion of the lamp and increasing the amount of heat given off. All of the heat is drawn directly into the carbureter and the stream of hot air strikes directly upon the metal valve or other fuel measuring mechanism and the jet of fuel emitted by it, thereby vaporizing the fuel and at once producing a combustible mixture. The combustion in the lamp continues until the fuel is exhausted by which time the engine is operating normally and the lamp is no longer required.

The device embodying my invention is very economical since all the heat generated is supplied directly to the air stream and practically none of it is wasted by radiation; also because only a limited amount of liquid fuel can be placed in the lamp, this being ample to start the engine even under the more severe conditions. There is no fire risk from the use of the device since screens are employed to separate the lamp from the carbureter and since the lamp is filled and lighted at a distance from the vehicle and inserted in the intake manifold without raising the hood. The lamp does not depend for its operation on the use of electrical current and therefore puts no additional strain on the battery of the car and is more reliable in its operation. When not in use, the device is not in the way and requires no care or attention.

The invention will be fully understood from the following description when taken in connection with the accompanying drawings, and the novel features thereof will be pointed out and clearly defined in the claims at the close of this specification. In the drawings—

Fig. 1 is an elevation, partly in section, of an engine bonnet, carbureter and intake pipe to which are applied a lamp embodying my invention.

Fig. 2 is a detail on an enlarged scale of a branch of the intake pipe, bell and lamp.

Fig. 3 is a vertical section of the lamp removed from the vehicle.

Fig. 4 is a top plan view of the lamp, a portion of the protruding end of the intake pipe being shown.

Fig. 5 is a rear view of member 31 which forms a part of the burner.

The drawings illustrate the application of the device embodying my invention to a motor vehicle of standard make, but it will be apparent to those skilled in the art that the device is equally applicable to other types of motor vehicles, the requisite adaptations being a matter of mere mechanical skill.

At 11 is shown the engine casting, at 12 a carbureter of well-known form, at 13 the air intake thereof and at 14 a choke valve. Connected to the air intake 13 is a bell 10 having two branches one of which, 15, is connected to a pipe 16 which leads over the top of the engine to a stove 17 surrounding the exhaust manifold 18. These parts are of ordinary construction and adapted to supply hot air to the carbureter during the normal operation of the engine after it has been run long enough to heat the exhaust manifold 18. The other branch 19 of the bell 10 protrudes through a hole 20 in the bonnet 21. The bell 10 is ordinarily made of a thin casting of suitable metal and contains one or more screens 22, 23, which permit flow of air through the branch 19 to the carbureter but extinguish flames and, therefore, prevent premature ignition or back-firing of the mixture produced by the carbureter. Within the open end of the branch 19, and closely adjacent the carbureter, is inserted a lamp which is shown in section in Figure 3. This lamp comprises a body 24, a sleeve 25 slipped into the end of the body and spot-welded or otherwise secured thereto, a cap 26 and a burner 27. The burner contains a space $a$ for asbestos wool or some other absorbent but non-combustible material which is held in place by a screen 28. This screen is surrounded by a flange 29 pierced by air holes 30. The burner is itself supported on a stamping 31 (see Figure 5) which is spot-welded or otherwise permanently secured inside the body 24. The stamping 31 has a boss $b$ eccentrically located and surrounded by a flange $c$ to which the boss is connected by ribs $d$ leaving air passages $e, e$. The body itself is provided with holes 33 through which air enters on its way to the burner and to the carbureter. The lamp is closed by a cap 34 preferably made of heat insulating material so that the lamp, even if it should become very hot, can be handled comfortably. The lamp is secured in place in the end of the branch of the intake pipe by a pair of studs 35 which engage slots 36, (see Figure 4), and together form a bayonet joint.

The operation of my device is as follows:—

When it is desired to start the cold engine, the lamp is removed, being readily unlocked from the bayonet joint. The burner is then filled with alcohol. Since the alcohol cannot rise above the level indicated by the dotted line $f$ in Figure 3, only a predetermined amount of alcohol can be burned without refilling. After the burner has been filled, the lamp is lighted with a match and is then inserted in the intake pipe and secured in place by the bayonet joints. The heat from the flame rises and heats the bell 10 and adjacent parts. The engine may be then cranked immediately. This creates a strong draft through the lamp, the air entering through the holes 33, then passing through the holes $e$ and between the burner and the body of the lamp and finally surrounding the burner and improving the combustion so that an intense flame results. The products of combustion pass through the screens 22, 23, which extinguish the flame, directly into the carbureter and into contact with the jet of fuel which is emitted by the metering pin or needle valve. The heat is so intense that the fuel is vaporized almost instantly and passes into the engine in excellent condition to produce effective explosions in the cylinders of a cold engine. After the engine starts, the lamp continues to supply heat to the mixture stream until the fuel in the lamp is exhausted. Then the lamp ceases to function without any attention on the part of the operator. Thereafter and until the lamp is again required, even if this be a matter of months, the device requires no attention whatever and is ready to operate again when supplied with a charge of fuel.

Since the lamp is located in the intake pipe, as distinguished from the intake manifold, it has no effect on the adjustment of the carbureter. Since it is insertable without lifting the bonnet, and since the flame is enclosed entirely in the bell or branch of the intake pipe, there is no fire risk whatever notwithstanding the fact that the lamp is located closely adjacent the carbureter and consequently in a position to permit the most efficient utilization of the heat generated. Other advantages will also be apparent.

What I claim is—

1. The combination with a bonnet of an automobile and a carbureter for the engine thereof, of an air intake pipe leading to the carbureter and having an opening through the bonnet and a liquid fuel lamp insertable into said air intake pipe from the exterior of the bonnet.

2. In combination with a carbureter having an air intake pipe leading thereto, a liquid fuel lamp insertable into the intake pipe, said lamp being constructed to close the intake pipe and having a burner which has air passages leading from the exterior to and around the burner.

3. In combination with a bonnet of an automobile and a carbureter for the engine thereof, an intake pipe for the carbureter leading through a hole in the bonnet, a lamp insertable from the exterior of the bonnet into said intake pipe, said lamp having air entrance holes on the exterior of the bonnet.

4. In combination with a carbureter and the bonnet of an automobile, an air intake pipe therefor having two branches, one of said branches leading through the bonnet to the outer air and a lamp insertable into the end of the branch leading through the bonnet, said lamp being insertable from the exterior of the bonnet.

5. In combination with a carbureter and a bonnet of an automobile, an air intake pipe having two branches connected to each other by a bell, one of said branches leading through the bonnet to the exterior thereof, a lamp insertable into said branch and closing it and air passages leading through said lamp into the bell.

6. In combination with a carbureter and a bonnet of an automobile, an air intake pipe leading to the carbureter and having two branches, one of said branches leading to a stove about the exhaust pipe of the engine, and the other through a hole in the bonnet to the exterior thereof, a liquid fuel lamp insertable into said branch and having air passages communicating with the air outside the bonnet and a burner in said lamp supplied with air drawn in through said passages.

In testimony whereof I affix my signature.

STEPHEN I. FEKETE.